(12) United States Patent
Cornwell et al.

(10) Patent No.: US 8,745,328 B2
(45) Date of Patent: *Jun. 3, 2014

(54) UPDATING ERROR CORRECTION CODES FOR DATA BLOCKS

(75) Inventors: Michael J. Cornwell, San Jose, CA (US); Christopher P. Dudte, San Jose, CA (US); Nir Jacob Wakrat, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 13/305,511

(22) Filed: Nov. 28, 2011

(65) Prior Publication Data

US 2012/0072807 A1    Mar. 22, 2012

Related U.S. Application Data

(60) Continuation of application No. 13/035,314, filed on Feb. 25, 2011, now Pat. No. 8,069,307, which is a division of application No. 11/739,818, filed on Apr. 25, 2007, now abandoned.

(51) Int. Cl.
*G06F 12/00*    (2006.01)
*G06F 11/07*    (2006.01)
*G06F 3/06*    (2006.01)

(52) U.S. Cl.
CPC .......... *G06F 11/0778* (2013.01); *G06F 3/0679* (2013.01)
USPC .......................................... 711/115; 711/103

(58) Field of Classification Search
CPC . G06Q 20/341; G06F 3/0679; G06F 11/0778; G06F 11/0766

USPC .......... 711/103, 115, E12.001; 714/723, 730, 714/E11.055

See application file for complete search history.

(56) References Cited

U.S. PATENT DOCUMENTS

| | | | |
|---|---|---|---|
| 4,974,181 A | 11/1990 | Sinderson et al. |
| 5,224,070 A | 6/1993 | Fandrich et al. |
| 5,450,365 A | 9/1995 | Adachi |
| 5,473,753 A | 12/1995 | Wells et al. |
| 5,577,194 A | 11/1996 | Wells et al. |
| 5,592,641 A | 1/1997 | Fandrich et al. |
| 5,602,775 A | 2/1997 | Vo |

(Continued)

FOREIGN PATENT DOCUMENTS

| | | |
|---|---|---|
| TW | 200636719 A | 10/2006 |
| WO | WO 96/17460 | 6/1996 |
| WO | WO 98/15149 | 9/1998 |

OTHER PUBLICATIONS

Communication pursuant to Article 94(3) EPC in Application No. 08746815.3 dated Apr. 4, 2012; 6 pages.

(Continued)

*Primary Examiner* — Pierre-Michel Bataille
(74) *Attorney, Agent, or Firm* — Meyertons, Hood, Kivlin, Kowert & Goetze, P.C.

(57) ABSTRACT

Systems and processes may be used to retrieve metadata from a nonvolatile memory of a portable device and transmit the retrieved metadata to an external host. Metadata may be analyzed using the external host and/or at least a portion of the metadata may be modified based on the analysis. Modified metadata may be transmitted from the external host to a memory controller of the host.

18 Claims, 5 Drawing Sheets

(56) References Cited

U.S. PATENT DOCUMENTS

| | | | |
|---|---|---|---|
| 5,602,987 A | 2/1997 | Harari et al. | |
| 5,621,685 A | 4/1997 | Cernea et al. | |
| 5,633,824 A | 5/1997 | Onuki | |
| 5,671,229 A | 9/1997 | Harari et al. | |
| 5,719,808 A | 2/1998 | Harari et al. | |
| 5,737,240 A | 4/1998 | Ellsworth | |
| 5,848,009 A | 12/1998 | Lee et al. | |
| 5,880,996 A | 3/1999 | Roohparvar | |
| 6,014,755 A | 1/2000 | Wells et al. | |
| 6,052,306 A | 4/2000 | Sedlak et al. | |
| 6,075,941 A | 6/2000 | Itoh et al. | |
| 6,081,447 A | 6/2000 | Lofgren et al. | |
| 6,148,435 A | 11/2000 | Bettman | |
| 6,149,316 A | 11/2000 | Harari et al. | |
| 6,151,246 A | 11/2000 | So et al. | |
| 6,249,890 B1 | 6/2001 | Ukani et al. | |
| 6,260,156 B1 | 7/2001 | Garvin et al. | |
| 6,269,025 B1 | 7/2001 | Hollmer et al. | |
| 6,304,487 B1 | 10/2001 | Pawletko et al. | |
| 6,334,027 B1 | 12/2001 | Fukuoka et al. | |
| 6,381,670 B1 | 4/2002 | Lee et al. | |
| 6,426,893 B1 | 7/2002 | Conley et al. | |
| 6,470,413 B1 | 10/2002 | Ogawa | |
| 6,516,381 B1 | 2/2003 | Hamilton et al. | |
| 6,542,910 B2 | 4/2003 | Cork et al. | |
| 6,567,930 B1 | 5/2003 | Moriya | |
| 6,611,724 B1 | 8/2003 | Buda et al. | |
| 6,611,907 B1 | 8/2003 | Maeda | |
| 6,639,864 B2 | 10/2003 | Sundaram et al. | |
| 6,662,314 B1 | 12/2003 | Iwata et al. | |
| 6,708,289 B1 | 3/2004 | Kudo | |
| 6,721,820 B2 | 4/2004 | Zilberman et al. | |
| 6,728,913 B1 | 4/2004 | Parker | |
| 6,747,827 B1 | 6/2004 | Bassett et al. | |
| 6,748,562 B1 | 6/2004 | Krech, Jr. et al. | |
| 6,754,765 B1 | 6/2004 | Chang et al. | |
| 6,757,842 B2 | 6/2004 | Harari et al. | |
| 6,763,424 B2 | 7/2004 | Conley | |
| 6,772,276 B2 | 8/2004 | Dover | |
| 6,895,464 B2 | 5/2005 | Chow et al. | |
| 6,904,506 B2 | 6/2005 | Wu et al. | |
| 6,914,846 B2 | 7/2005 | Harari et al. | |
| 6,947,332 B2 | 9/2005 | Wallace et al. | |
| 6,947,865 B1 | 9/2005 | Mimberg et al. | |
| 6,956,769 B2 | 10/2005 | Lee | |
| 6,961,890 B2* | 11/2005 | Smith | 714/763 |
| 6,982,919 B2 | 1/2006 | Kumahara et al. | |
| 7,013,406 B2 | 3/2006 | Naveh et al. | |
| 7,032,087 B1 | 4/2006 | Chang et al. | |
| 7,035,159 B2 | 4/2006 | Janzen et al. | |
| 7,058,748 B1 | 6/2006 | Jacobs et al. | |
| 7,065,689 B2 | 6/2006 | Chiu et al. | |
| 7,068,456 B2 | 6/2006 | Walz | |
| 7,100,168 B1 | 8/2006 | Wenzl | |
| 7,127,622 B2 | 10/2006 | Schnepper | |
| 7,137,011 B1 | 11/2006 | Harari et al. | |
| 7,161,834 B2 | 1/2007 | Kumahara et al. | |
| 7,162,569 B2 | 1/2007 | Conley et al. | |
| 7,200,066 B2 | 4/2007 | Krenzke et al. | |
| 7,212,463 B2 | 5/2007 | Zeevi et al. | |
| 7,237,046 B2 | 6/2007 | Paley et al. | |
| 7,237,074 B2 | 6/2007 | Guterman et al. | |
| 7,239,557 B2 | 7/2007 | Ha | |
| 7,240,219 B2 | 7/2007 | Teicher et al. | |
| 7,277,978 B2 | 10/2007 | Khatami et al. | |
| 7,278,038 B2 | 10/2007 | Schnepper | |
| 7,281,040 B1 | 10/2007 | Ly | |
| 7,286,435 B2 | 10/2007 | Odate et al. | |
| 7,304,891 B2 | 12/2007 | Kim | |
| 7,318,181 B2 | 1/2008 | Naso et al. | |
| 7,395,466 B2 | 7/2008 | Dempsey | |
| 7,444,490 B2 | 10/2008 | Cases et al. | |
| 7,464,306 B1 | 12/2008 | Furuhjelm et al. | |
| 7,480,792 B2 | 1/2009 | Janzen et al. | |
| 7,512,847 B2 | 3/2009 | Bychkov et al. | |
| 7,568,135 B2* | 7/2009 | Cornwell et al. | 714/721 |
| 7,650,541 B2* | 1/2010 | Roohparvar | 714/723 |
| 7,921,339 B2* | 4/2011 | Chen et al. | 714/54 |
| 8,095,851 B2* | 1/2012 | Diggs et al. | 714/763 |
| 8,422,303 B2* | 4/2013 | Franca-Neto et al. | 365/185.2 |
| 2002/0156798 A1* | 10/2002 | Larue et al. | 707/201 |
| 2003/0021157 A1 | 1/2003 | Matsubara et al. | |
| 2003/0033465 A1 | 2/2003 | Chien et al. | |
| 2003/0041295 A1 | 2/2003 | Hou et al. | |
| 2003/0111988 A1 | 6/2003 | Sundaram et al. | |
| 2003/0131185 A1 | 7/2003 | Dover | |
| 2004/0049627 A1 | 3/2004 | Piau et al. | |
| 2004/0089717 A1 | 5/2004 | Harari et al. | |
| 2004/0145931 A1 | 7/2004 | Lin et al. | |
| 2004/0157638 A1 | 8/2004 | Moran et al. | |
| 2004/0172576 A1 | 9/2004 | Yoshii et al. | |
| 2004/0174763 A1 | 9/2004 | Schnepper | |
| 2004/0250092 A1 | 12/2004 | Hori et al. | |
| 2004/0268165 A1 | 12/2004 | May et al. | |
| 2005/0044454 A1 | 2/2005 | Moshayedi | |
| 2005/0083726 A1 | 4/2005 | Auclair et al. | |
| 2005/0152202 A1 | 7/2005 | Choi et al. | |
| 2005/0188230 A1 | 8/2005 | Bilak | |
| 2005/0204187 A1 | 9/2005 | Lee et al. | |
| 2005/0226050 A1 | 10/2005 | Crosby | |
| 2005/0281112 A1 | 12/2005 | Ito et al. | |
| 2006/0005070 A1 | 1/2006 | Zimmer et al. | |
| 2006/0010282 A1 | 1/2006 | Kim | |
| 2006/0062052 A1 | 3/2006 | Kumahara et al. | |
| 2006/0085670 A1 | 4/2006 | Carver et al. | |
| 2006/0126415 A1 | 6/2006 | Matarrese et al. | |
| 2006/0136900 A1 | 6/2006 | Kim et al. | |
| 2006/0142977 A1 | 6/2006 | Oh et al. | |
| 2006/0161728 A1 | 7/2006 | Bennett et al. | |
| 2006/0195708 A1 | 8/2006 | Kato et al. | |
| 2006/0203556 A1 | 9/2006 | Chen et al. | |
| 2006/0225073 A1 | 10/2006 | Akagawa et al. | |
| 2006/0280019 A1 | 12/2006 | Burton et al. | |
| 2007/0008801 A1 | 1/2007 | Chiang et al. | |
| 2007/0014136 A1* | 1/2007 | Ali et al. | 365/1 |
| 2007/0014176 A1 | 1/2007 | Krenzke et al. | |
| 2007/0055843 A1 | 3/2007 | Lameter | |
| 2007/0180328 A1 | 8/2007 | Cornwell et al. | |
| 2007/0183275 A1 | 8/2007 | Maeda et al. | |
| 2007/0283428 A1 | 12/2007 | Ma et al. | |
| 2008/0072120 A1* | 3/2008 | Radke | 714/768 |
| 2008/0086275 A1 | 4/2008 | Astigarraga et al. | |
| 2009/0024905 A1* | 1/2009 | Shalvi et al. | 714/773 |
| 2009/0150748 A1 | 6/2009 | Egner et al. | |
| 2011/0320915 A1* | 12/2011 | Khan | 714/773 |

OTHER PUBLICATIONS

"Common Flash Memory Interface Specification," Release 2.0, Dec. 1, 2001; pp. 1-25.

"Two Technologies Compared: NOR vs. NAND White Paper," Jul. 2003, 91-SR-012-04-8L, Rev 1.1, pp. 1-14.

"ATA Flash Disk Controller," 2004 Silicon Storage Technology, Inc.; pp. 1-76.

"512M IDS Jan. 27, 2010 8 Bit / 1G IDS Jan. 27, 2010 8 Bit NAND Flash Memory," Flash Memory, Samsung Electronics, pp. 1-38.

"Portalplayer, Inc.—Products," http://www.portalplayer.com/products/indeIDS 1/27/10.html, pp. 1-5.

PCT Invitation to Pay Additional Fees and, Where Applicable, Protest Fee, PCT/US2008/061463, mailed Sep. 11, 2008, (9 pages).

International Search Report and Written Opinions for PCT Application No. PCT/US2008/061463, dated Jan. 30, 2009 18 pages.

Quantum Fireball SE 2.1/3.2/4.3/6.4/8.4 GB AT Product Manual, Oct. 1997, Quantum Corporation, pp. 25-30, 50-60.

International Preliminary Report on Patentability for Application No. PCT/US2008/061463, dated Nov. 5, 2009, 10 pages.

Communication Pursuant to Article 94(3) EPC issued in EP 08 746 815.3-1225 on Jul. 9, 2010, 4 pages.

Communication Pursuant to Article 94(3) EPC issued in EP 08 746 815.3-1225 on Apr. 4, 2012, 6 pages.

Office Action and Search Report issued in Taiwan Application No. 097115148; Mar. 22, 2012; 12 pages.

Office action and translation thereof in TW Application No. 097115148, mailed Sep. 6, 2012, pp. 1-7.

* cited by examiner

UPDATING ERROR CORRECTION CODES FOR DATA BLOCKS

CLAIM OF PRIORITY

This application is a continuation of U.S. application Ser. No. 13/035,314 filed on Feb. 25, 2011, which is a divisional of U.S. application Ser. No. 11/739,818 filed on Apr. 25, 2007, which is incorporated herein by reference.

TECHNICAL FIELD

The present invention relates to systems and processes for accessing data, and more particularly to accessing metadata on a memory of a host using an external host

BACKGROUND

Metadata may describe other data (e.g., user data) stored on memory. Metadata may be stored on the same memory as the user data and provide information about the user data or memory. For example, metadata can provide a variety of information about the memory and its operations, such as data regarding bad blocks on a flash memory or erase counts. Metadata may also provide information such as the time certain data was stored, file size, and/or file type.

SUMMARY

Metadata may be transmitted from a memory of a host to an external host. The metadata may be analyzed and operations may be performed based on the analysis. With the use of portable devices, analyzing and processing the metadata may require relatively large power consumption and processing capabilities and so analyzing and processing may be performed by an external host, such as a computer connected to the portable device.

In one general aspect, metadata for a nonvolatile memory of a portable device is received from the portable device by an external host, an analysis of the retrieved metadata is performed using the external host, the retrieved metadata is modified based on the analysis, and at least the modified portion of the retrieved metadata is transmitted to a memory controller of the portable device. The memory controller controls the memory of the portable device.

Implementations may include one or more of the following features. Received metadata may include time stamps and the time stamps may be analyzed. Analyzing the time stamps may include determining whether data associated with one or more of the time stamps should be rewritten based at least partially on the time stamp. A command signal may be transmitted to rewrite data associated with time stamps, and time stamps associated with rewritten data may be updated. An analysis of time stamps may include determining whether at least one of the time stamps should be adjusted and time stamps may be adjusted based on the determination. Received metadata may include bad block data, where bad block data includes a listing of blocks in the memory that do not satisfy performance criteria. Analysis of bad block data may include transmitting one or more command signals to the memory controller of a host. Command signals may determine whether one or more blocks in the listing of blocks satisfy performance criteria.

Metadata, such as the bad block data, may be modified at least partially based on the analysis. Received metadata may include error correcting code data. An analysis of error correcting code data may include determining whether the error correcting code data should be modified. Modifying the error correcting code may include modifying at least a portion of the error correcting code data. Error correcting code data may be modified to be compatible with the memory controller of the host. Received metadata may include erase count. Analysis of the erase count may include performing testing of blocks based on the erase count. Metadata may be modified at least partially based on the analysis of the erase count. A procedure for moving data among physical blocks may be initiated. A notice may be presented on a user interface. In some implementations, nonvolatile memory may be a flash memory.

In another general aspect, establishment of a connection between an external host and a host is detected, and metadata is retrieved from a memory of the host and transmitted to the external host. An analysis is performed on the retrieved metadata, and the retrieved metadata is modified based on the analysis. At least the modified portion of the retrieved metadata is transmitted for storage on multiple blocks in the memory of the host. Metadata is retrieved across the connection between the host and the external host.

Implementations may include one or more of the following features. Detecting the establishment of a connection may include detecting a bus connection between the external host and the host. Procedures for moving data among physical blocks may be initiated. Retrieved metadata may include time stamps and the time stamps may be analyzed. Analyzing the time stamps may include determining whether data associated with at least one of the time stamps should be rewritten based at least partially on the time stamp. A command signal may be transmitted to rewrite data associated with time stamps, and time stamps associated with rewritten data may be updated. An analysis of time stamps may include determining whether at least one of the time stamps should be adjusted, and times stamps may be adjusted based on the determination.

Retrieved metadata may include bad block data, where bad block data includes a listing of blocks in the memory that do not satisfy performance criteria. Analysis of bad block data may include transmitting one or more command signals to the memory controller of a host. Command signals may determine whether one or more blocks in the listing of blocks satisfy performance criteria. Metadata, such as the bad block data, may be modified at least partially based on the analysis. Retrieved metadata may include error correcting code data. An analysis of error correcting code data may include determining whether the error correcting code data should be modified. Modifying the error correcting code may include modifying at least a portion of the error correcting code data (e.g., making the error correcting code more stringent). Error correcting code data may be modified to be compatible with the memory controller of the memory of the host. Retrieved metadata may include erase count. Analysis of the erase count may include performing testing of blocks based on the erase count. Metadata may be modified at least partially based on the analysis of the erase count.

In another general aspect, a communication interface of an external host communicates with a host to retrieve metadata for the memory of the host. An analysis module of the external host analyzes retrieves metadata and determines whether to modify at least a portion of the retrieved metadata based at least partially on the analysis.

Implementations may include one or more of the following features. The communication interface may include a bus. The communication interface may communicate with the host using one or more network protocols.

The details of one or more implementations are set forth in the accompanying drawings and the description below. Other features will be apparent from the description, the drawings, and from the claims.

DESCRIPTION OF DRAWINGS

Like reference symbols in the various drawings indicate like elements.

DETAILED DESCRIPTION

Figure 1:
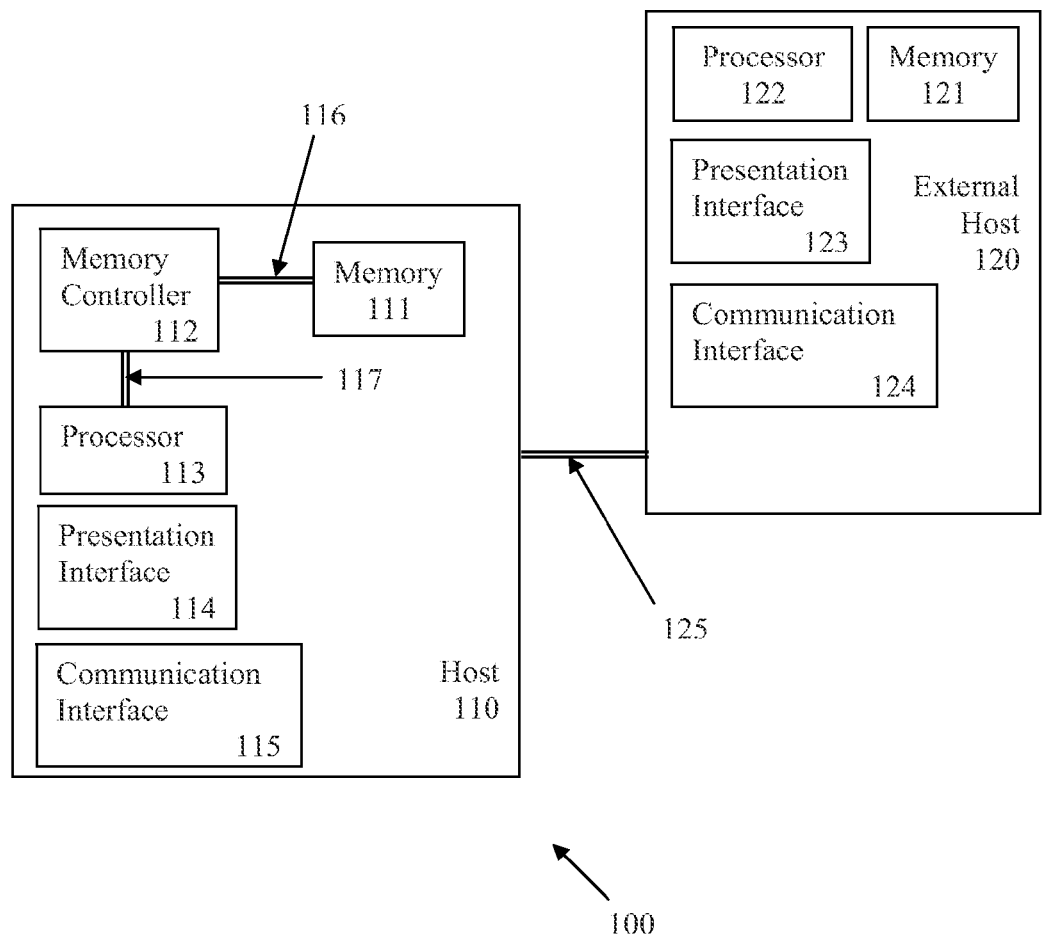
FIG. 1 illustrates an example of a host and an external host.

FIG. 1 illustrates an example system 100. System 100 may include a host 110. Host 110 may be any electronic or computing device that uses nonvolatile memory including, for example, portable and desktop computers, clients, servers, consumer electronics, calculators, network appliances, media players/recorders, game consoles, mobile phones, email devices, personal digital assistants (PDAs), embedded devices, televisions, system-on-chip (SoC), set-top boxes, audio recorders, handheld data collection scanners, and/or monitoring devices. Host 110 may include a memory 111, a memory controller 112, a processor 113, a presentation interface 114, and/or a communication interface 115. Memory controller 112 and/or processor 113 may include individual chips, a chip set, or can be integrated together on a single chip (e.g., a SoC solution).

Memory 111 may be nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), phase-change memory (PRAM), and/or any other memory that does not need its memory contents periodically refreshed and/or can retain information without power. Memory 111 may include memory chips or memory modules (e.g., single in-line memory modules (SIMMs) or dual in-line memory modules (DIMMs)). In some implementations, memory 111 may be electrically erasable. Memory 111 may have a finite number of write/erase cycles. For example, after a number of write/erase cycles, the ability of a cell of memory 111 to maintain a specified charge may be impaired. For example, a memory cell may leak electrons. As another example, an electric charge may not be substantially removable from a memory cell. Cells of a nonvolatile memory may not be individually erasable, such as in flash memory. For example, a cell of a block may be erased by erasing the entire block in which the cell resides. Similarly, writing new data to a portion of a block may require erasing the entire block and rewriting any unchanged portions of the block along with the new data.

Figure 2:
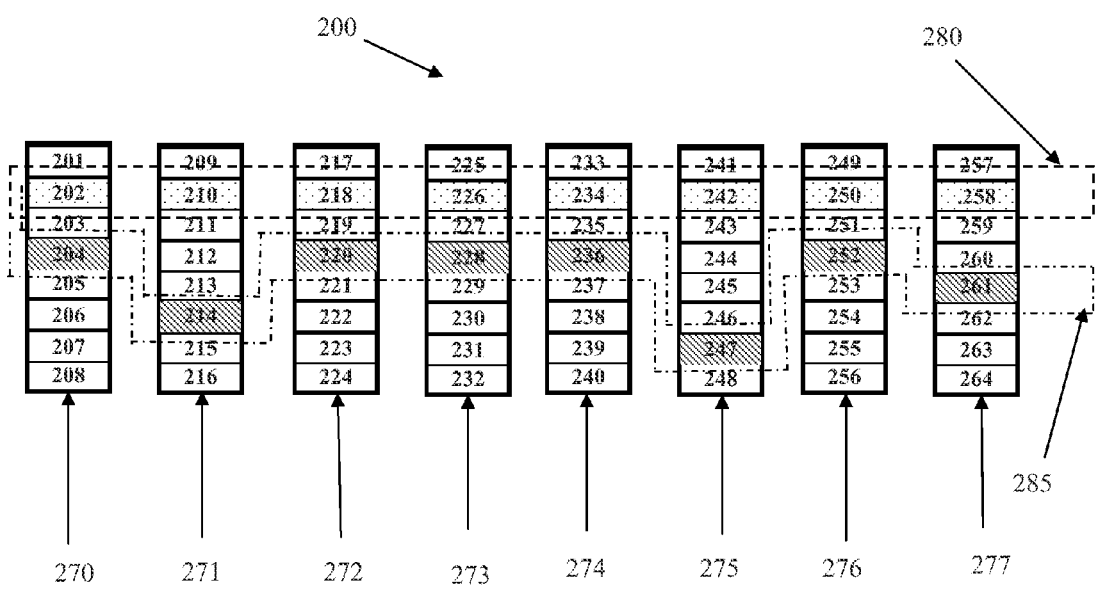
FIG. 2 illustrates an example configuration of a memory.

In some implementations, memory may be interleaved to increase performance of the host. FIG. 2 depicts a representation of a portion of a memory 200. Memory 200 may include physical blocks 270-277. Each physical block 270-277 may include cells 201-264. For example, physical block 270 may include cells 201-208 and physical block 271 may include cells 209-216. The physical blocks 270-277 and cells 201-264 depicted in FIG. 2 are for purposes of illustration and do not represent a typical implementation. For example, in the case of flash memory, physical blocks typically include a much larger number of cells (e.g., sufficient to store 512 or 2048 bytes), which may be divided into pages (e.g., of 64 bytes), although any size of physical blocks and any number of cells can be used.

During operation, memory 111 may receive signals from memory controller 112 over Input/Output (I/O) bus 116, which enables memory 111 to carry out memory access requests (e.g., read or write operations) received by the memory controller 112 from the processor 113 (see FIG. 1). Memory 111 may be interleaved, so that read or write requests to logical block addresses 280 and 285 (LBAs) are mapped to physical memory addresses that include two or more physical blocks 270-277 (see FIGS. 1 and 2). Interleaving may increase performance (e.g., by decreasing read and/or write times by allowing multiple parallel reads or writes) or protecting against lost data (e.g., by providing some degree of redundancy across different physical blocks) of memory 111. Host 110 (e.g., using processor 113) may perform reads and writes to LBAs 280, 285, which are mapped or translated (e.g., by memory controller 112) to physical block addresses 270-277 of memory. For example, LBA 280 includes cells 202, 210, 218, 226, 234, 242, 250, and 258 and LBA 285 includes cells 204, 214, 220, 228, 236, 247, 252, and 261. In some situations, mapping may help make a memory appear similar to a hard disk drive to the host (e.g., to the operating system of the processor).

In some implementations, physical blocks may be mapped to virtual blocks. Virtual blocks may make a memory appear continuous. For example, bad blocks may be omitted from a virtual block listing. Virtual blocks may be mapped to LBAs to increase memory performance by allowing interleaving.

Memory controller 112 may be any device that manages memory access including, for example, programmable memory controllers, flash disk controllers, direct memory access (DMA) controllers, logic devices, field-programmable gate arrays (FPGAs), and/or central processing units (CPUs). Examples of memory controller 112 may include the family of ATA Flash Disk Controllers (e.g., device nos. SST55LD019A, SST55LD019B, SST55LD019C, etc.), manufactured by Silicon Storage Technology, Inc. (Sunnyvale, Calif.). In some implementations, memory controller 104 supports single-level cell (SLC) and/or multi-level cell (MLC) flash media.

In some implementations, memory controller 112 may recognize control, address, and/or data signals transmitted on bus 117 by processor 113. Memory controller 112 may translate the control, address, and/or data signals into memory access requests on memory 111. Bus 117 may be an Integrated Drive Electronics (IDE)/Advanced Technology Attachment (ATA) bus that transfers control, address and data signals using IDE/ATA standard bus protocol (e.g., ATA-6 bus protocol). IDE/ATA signals may be generated by processor 113 and translated by the memory controller 112 into memory access requests in a format or protocol appropriate for communicating with the memory 111 across bus 116.

Processor 113 may include a programmable logic device, a microprocessor, or any other appropriate device for manipulating information in a logical manner. A processor may execute the operating system for the host. An example of processor 113 is a PP5002 Superintegration™ SoC controller manufactured by PortalPlayer, Inc. (San Jose, Calif.). The PP5002 controller may provide a platform for media player/recorder systems and/or other products that use non-volatile memory.

During use, an application running on processor 113 may request access to data stored on memory 111, see FIG. 1. For example, a user of a host 110 (e.g., a media player/recorder) or an external host 120 (e.g., a desktop or laptop computer) connected to the host 110 may submit a request to save a song to memory 111. A media player/recorder application may send the request to an operating system running on the processor 113, which formats the request into IDE/ATA signals. IDE/ATA signals may be transmitted to memory controller 112 on bus 117 by processor 113. Memory controller 112 may translate the request to access memory 111 via bus 116.

In some implementations, processor 113 may include memory controller 112. For example, the processor 113 and memory controller 112 may be an integrated processor unit. Processors with integrated memory controllers may be commercially available from Freescale Semiconductor (Austin, Tex.) and Texas Instruments (Dallas, Tex.). Utilizing an integrated processor 113 and memory controller 112 may decrease production cost of host 110, facilitate manufacture of host 110, and/or make process execution more efficient. For example, utilizing a single processor/memory controller decreases the number of steps in fabrication.

Presentation interface 114 may present data such as videos, music, messages from the host 105 and/or external host 120, graphical interface for various applications stored on the host (e.g., graphical interface for playing music, videos, manipulating data, etc). For example, presentation interface 114 may present data in visual and/or audio format. Presentation interface 114 may include display device, such as a screen, and/or speakers. Presentation interface may include a graphical interface.

Communication interface 115 may allow communication with other devices. Communication interface 115 may transmit data from host 110 to, and/or receive data from, external host 120 via network protocols (e.g., TCP/IP, Bluetooth, and/or Wi-Fi) and/or a bus (e.g., serial, parallel, USB, and/or FireWire).

Figure 3:
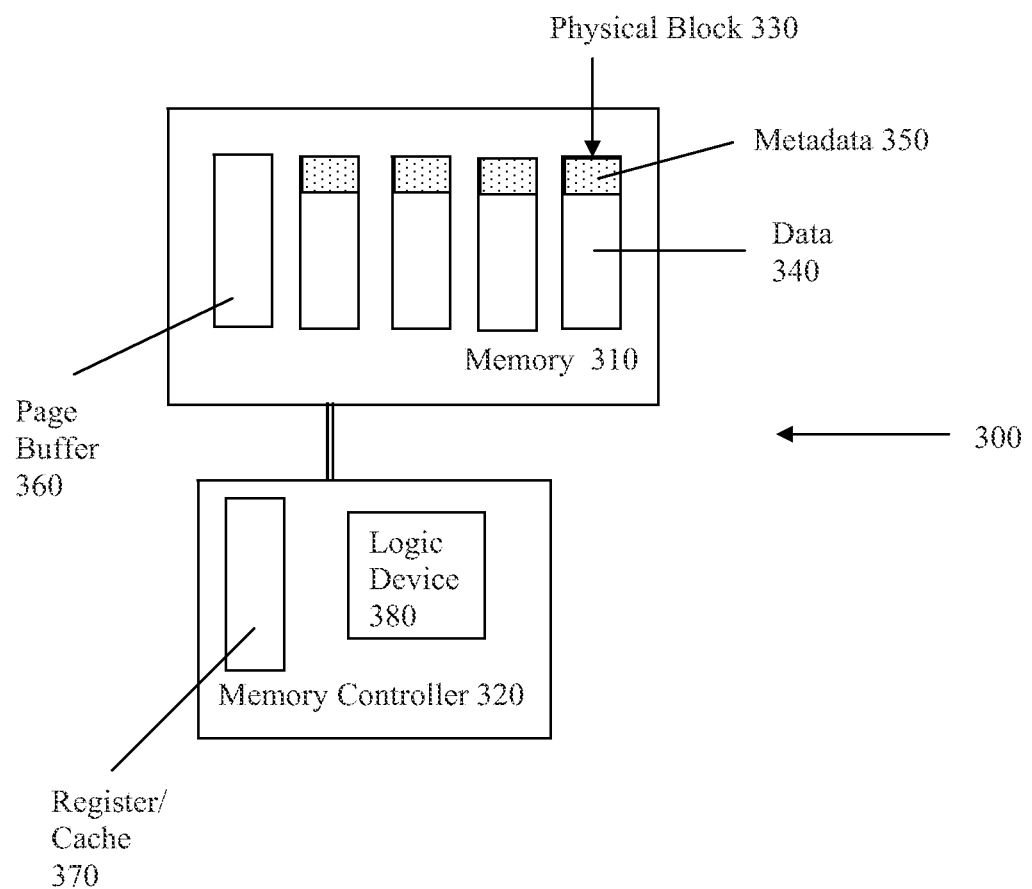
FIG. 3 illustrates an example of a memory controller coupled to a memory.

FIG. 3 illustrates a portion 300 of a host including a memory 310 and a memory controller 320. Memory 310 may include physical blocks 330 that store data 340 or are capable of storing data. A portion of a physical block 330 may store metadata 350. Metadata may include information about other data in the memory, such as listings of bad blocks in a memory or error correcting codes. Memory 310 may include a first buffer 360 (e.g., a page buffer) that is used to temporarily store data as it is being written to or read from the blocks 330. Memory controller 320 may include or be coupled to a second buffer 370 (e.g., a register or a cache). Second buffer 370 may be a volatile memory such as RAM or a nonvolatile memory such as flash memory.

Memory controller 320 may include a logic device 380 that interprets operations from a host or external host and/or performs operations on a coupled memory. Memory controller 320 operations may include use of at least two buffers 360 and 370 to facilitate operations (e.g., read or write), facilitate random data access operations, and/or increase performance. For example, memory controller 320 may read data from memory 310. In response to a read request from memory controller 320, data from data portion 340 of memory 310 may be loaded into first buffer 360 (e.g., data register or page register). The data in the first buffer 360 may be transmitted to second buffer 370 (e.g., cache, register, or cache register) which is coupled to memory controller 320. The second buffer 370 may accumulate multiple pages of data from the first buffer. Memory controller 320 may reformat data from second buffer 370 for delivery to processor 113 of the host 110 (see FIG. 1) (e.g., in IDE/ATA format). While or after data is transferred from first buffer 360 to second buffer 370, additional data may be loaded from data portions 340 of memory 310 to the first buffer 360.

Memory controller 320 may also input data received from a host or external host into second buffer 370 (e.g., cache) for programming of the array through first buffer 360.

The memory controller 320 may receive requests to read and/or write data to memory 310. The memory controller 320 may format the requests to an instruction format appropriate for the memory 310 (e.g., from or to IDE/ATA format). The memory controller 320 may then transfer the instructions in the appropriate format to the memory 311. The requests in the memory 310 may then be converted to the appropriate electrical charges or the appropriate portions of the memory may be transferred to the second buffer.

Although the above description discusses portions of each block as being for data and/or for metadata, portions of a block that are used for data or metadata may not be fixed. A particular portion of a block may include metadata at some times and include user data or other data at other times.

Host 110 may be coupled to an external host 120, as illustrated in FIG. 1, to transmit and/or receive data. For example, songs and/or videos may be downloaded from external host 120 (e.g., computer) to host 110, which may be a media player or other portable device. As another example, applications, such as firmware, operating systems, software for playing MP3s, software for playing videos and/or upgrades, updates, and/or modifications to applications (e.g., change in available features such as playlists) may be downloaded from external host 120 to host 110. Furthermore, data from the host 110 may be uploaded to external host 120. In addition, host 110 may be coupled to external host 120 to modify data on memory 111 of the host and/or memory 121 of the external host. Host 110 may be coupled to external host 120 to initiate and/or execute processes on the host.

Host 110 may be temporarily coupled to external host. For example, host 110 may be coupled to external host 120 using a connector 125 (e.g., serial bus, parallel bus, USB, and/or FireWire). Connector 125 may be an electrical connector. Connector 125 may allow a removable connection between host 110 and external host 120. A temporary coupling between host 110 and external host 120 may allow the host, such as a portable device, to be disconnected from the external host and/or physically moved away from the external host.

Host 110 may be wirelessly coupled to external host 120. Data may be transmitted using one or more network protocols (e.g., TCP/IP, Wi-Fi, 802.11g, 802.11n, IR or Bluetooth).

External host 120 may be any electronic or computing device including, for example, portable and desktop computers, clients, servers, consumer electronics, network appliances, etc. An external host 120 may include a memory 121, a processor 122, a presentation interface 123, and/or a communication interface 124.

Memory 121 may be a volatile memory (e.g., RAM) and/or nonvolatile memory (disk drive, flash memory, or other suitable memories). Processor 122 may be a programmable logic device, a microprocessor, or any other appropriate device for manipulating information in a logical manner. Presentation interface 123 may present data. Communication interface 124 may allow communication with other devices, such as host 110.

Figure 4:
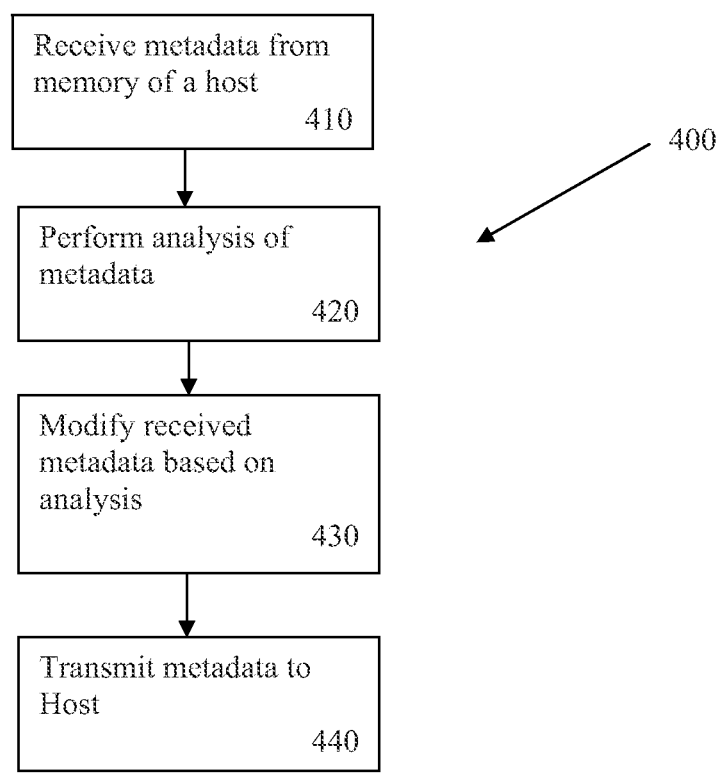
FIG. 4 illustrates an example process of an external host.

FIG. 4 illustrates an example process 400 of using an external host to manage a memory of a host. An external host may receive metadata from a memory of a host (operation 410). For example, an external host may transmit a request to a host and the host may transmit metadata to the external host in response to the request. A connection between the external host and the host may be detected prior to retrieving metadata from a memory of the host. The external host may be coupled to the host by a connection, such as a USB bus or FireWire bus, and data may be transmitted across the connection. As another example, external host may be indirectly coupled to the host and data may be transmitted using a network protocol.

An analysis of the received metadata may be performed (operation 420). The external host may analyze at least a portion of the metadata to determine if operations should be performed. One or more operations may be performed based on the analysis. For example, the external host may modify at least a portion of the received metadata based on the analysis (operation 430). As another example, the external host may initiate one or more procedures on the host based on the analysis. Metadata may be transmitted from the external host to the host (operation 440). For example, at least metadata that has been modified may be transmitted to a memory of the host.

Figure 5:
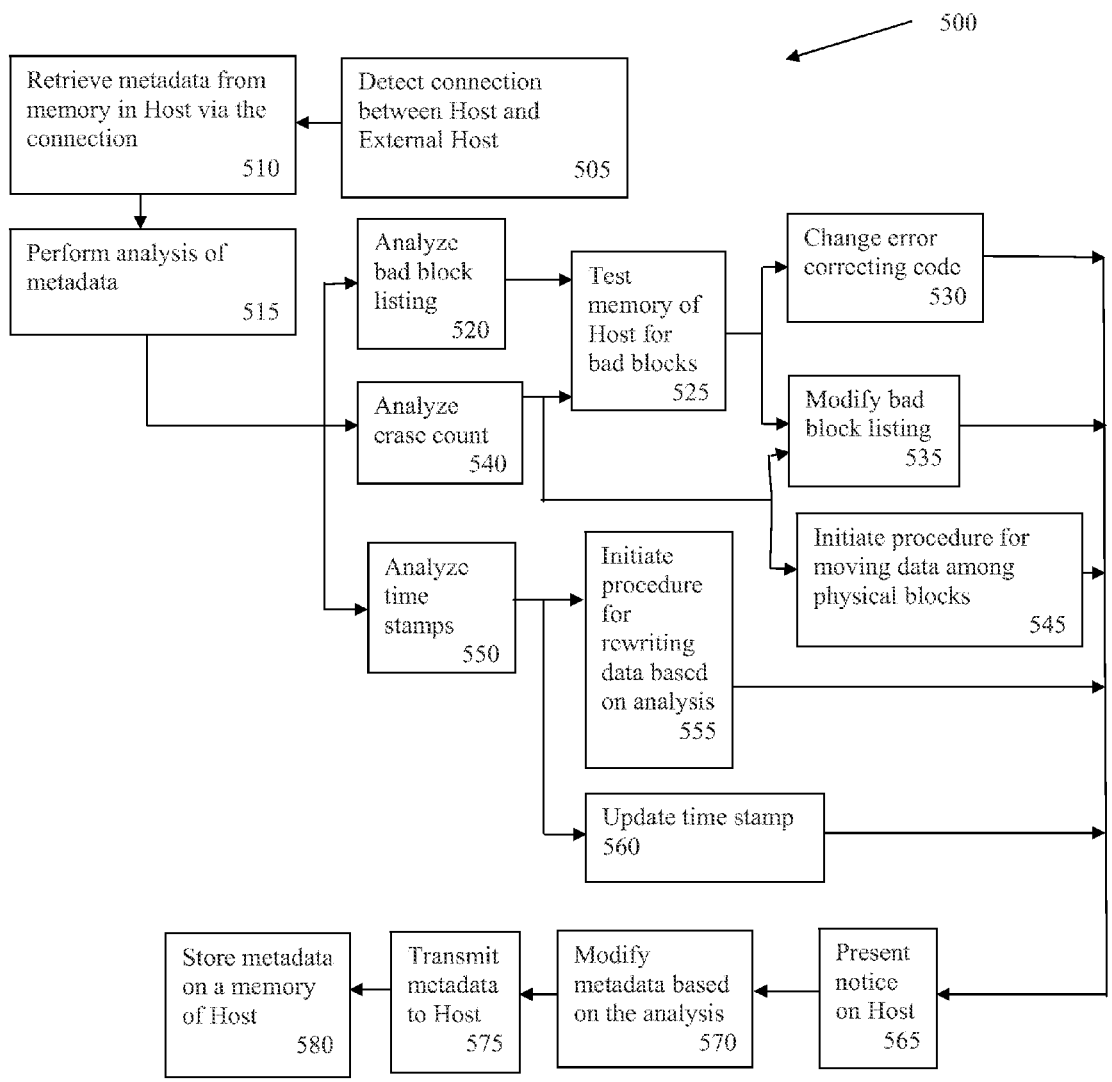
FIG. 5 illustrates an example process of analyzing metadata.

FIG. 5 illustrates another example process 500 for managing the memory of a host device. A connection between a host and an external host may be detected (operation 505). For example, external host may transmit a command signal (e.g., to determine if the host is ready), and the host may transmit a signal (e.g., indicating a ready condition or that the host is loading connection data) in response to the command signal. The connection may be a bus connection.

The external host may retrieve metadata from a memory of the host using the connection (operation 510). Metadata may include data that describes other data, such as listings of bad blocks in memory (e.g., factory specified bad blocks or other bad blocks), type of error correcting code executed on memory, write and/or erase counts, time stamps for when data is written to memory, and/or data describing mapping between PBAs and LBAs. External host may retrieve at least a portion of the metadata available on a memory of the host. In some implementations, the external host may retrieve specified portions of the metadata. For example, the external host may request time stamp metadata, and the host may transmit the time stamp metadata to the external host. As another example, external host may request and/or retrieve metadata relating to bad blocks, and the host may transmit bad block listings and/or erase counts. As another example, external host may retrieve metadata for a portion of the memory (e.g., for a portion of the PBAs or the LBAs of a memory).

An analysis may be performed on the retrieved metadata (operation 515). A processor of the external host may perform one or more analyses on the retrieved metadata to determine, for example, wear patterns and/or to detect a potential impending failure of the memory. After analysis of metadata, one or more processes may be performed based on the analysis. In some implementations, a processor may include an analysis module that analyzes the metadata (e.g., an application or series of processes).

Bad block listings from retrieved metadata may be analyzed (operation 520). Bad block listings may be analyzed to determine if blocks identified as bad may have been misidentified. Often factory identified bad blocks may be the result of testing over a wide range of temperatures and voltages. While a factory identified bad block may work or appear to work temporarily, the block may fail at other operating conditions and thus factory identified bad blocks may not be analyzed (e.g., retested or scrubbed). Other types of bad blocks may be identified by reading a status register which confirms successful completion of write and/or erase operations of a block. In some implementations, factory identified bad blocks may not be analyzed while a listing of other bad blocks (e.g., identified after the factory identified bad blocks or identified during use of the memory) may be analyzed.

A memory of the host may be tested to determine if bad blocks are appropriately identified (operation 525). For example, an external host may transmit a write and/or an erase command to the memory of the host to determine if a block is bad. External host may initiate testing of previously identified bad blocks on the host.

In some implementations, after testing bad blocks, an error correcting code (ECC) may be changed (operation 530). During programming, a processor and/or memory controller may calculate an ECC based on data. The calculated ECC may then be stored in the memory and associated with the data (e.g., the ECC may be stored in a metadata portion of the memory). When the data is read, the ECC may also be read and a reverse ECC operation may be performed to check that the data is read correctly. The ECC algorithm may correct data errors or a portion of data errors. The number of errors in data that can be corrected by the ECC algorithm may be based on the strength of the algorithm (e.g., a 4-bit ECC, 6-bit ECC, 8-bit ECC). In some implementations, continued use of blocks previously identified as bad or blocks in which errors are occurring may be achieved by increasing the strength of the ECC used. For example, the ECC may be strengthened by utilizing an 8-bit ECC rather than a 4-bit ECC. More stringent forms of ECC may require a larger portion of the memory to store the ECC, thus, the least stringent ECC that satisfies performance criteria (e.g., number of errors allowed) may be used. In some implementations, a more stringent ECC may allow continued use of blocks previously tested as bad or with a high number of errors, and thus, although a larger portion of the memory may be required to store the more stringent ECC, a larger portion of the memory may be available to a user with the continued use of the block, as opposed to if use of the block is discontinued.

In some implementations, bad block listings may be modified based on the testing of the memory (operation 535). For example, bad block listing may be modified if previously identified bad blocks pass testing. Bad block listings may be modified without testing the blocks. For example, at least some of the bad blocks may be removed and/or added to the bad block listing.

Analysis of the retrieved metadata may include analyzing erase counts (operation 540). For example, if erase counts exceed a specified value, the blocks associated with the erase counts may be labeled as a bad block. As another example, erase counts may be analyzed to determine wear patterns.

Some types of electrically erasable memory may have a limited number of write and/or erase cycles. As a block of a memory is erased repeatedly, the block may no longer completely erase (e.g., the tunnel release action in a flash memory may not remove the electrons in the cell). Erase counts may be analyzed to determine bad blocks. For example, when an erase count for a block exceeds a specified value, the block of the memory may be tested to determine if it is a bad block (operation 525). The ECC and/or bad block listings may be modified (operations 530 and 535) based on the testing. Although the above processes are described in terms of erase counts, similar processes may be executed on write counts.

A bad block listing may be modified based on analysis of erase counts (operation 535). For example, if an erase count for a block exceeds a specified value, then the block may be added to the bad block listing. In some implementations, the block may be tested prior to listing the block in the bad block listing. A block may be added to the bad block listing and tested at a later date. A block may be added to the bad block listing when it fails to erase completely as well.

An analysis of the erase count may additionally initiate a procedure for moving data among physical blocks (operation 545). For example, wear leveling procedures may be implemented in response to erase counts exceeding a specified value. Data in a block with a high erase count may be transferred to a block with a lower erase count. Data that will not be changed often may be transferred from a block with a low erase count to a block with a higher erase count.

In some implementations, if blocks are identified as bad after testing or wear leveling procedures are initiated, then mapping metadata (e.g., mapping physical blocks to virtual blocks, mapping physical blocks to LBAs, and/or mapping virtual blocks to LBAs) may be modified. For example, bad blocks and/or blocks with erase counts higher than a specified amount may not be included in the virtual block table. Modifying the virtual block table may affect LBAs, and LBAs may be remapped to virtual blocks. Metadata may be modified as a result, including the mapping of physical blocks to virtual blocks and/or virtual blocks to logical blocks. As another example, LBA 280 may be reordered if physical block 210 is bad and physical blocks 242 and 258 have high erase counts, see FIG. 2. Data in physical blocks 210, 242, and 258 may be replicated on physical blocks 214, 247, and 261, respectively forming a new LBA 285. Mapping metadata that describes the mapping between physical blocks, virtual blocks, and/or logical blocks may be modified based on the reordering. In some implementations, mapping between the physical blocks and virtual blocks may be modified but mapping between the virtual blocks and LBAs may not be modified. For example, although the physical block in which data is stored is changed, it may appear to the processor that no changes have occurred because the LBA remains unchanged.

In some implementations, time stamps in the retrieved metadata may be analyzed (operation 550). In some electrically erasable memory, such as in flash memory, electrons from within a cell may leach causing a potential for corruption of the value of the cell. In multilevel cells, for example, leaching electrons may cause a voltage across a cell to change from 40% to 25% of the maximum voltage and thus may cause the cell to be read incorrectly. If at least a specified amount of time lapses from a time stamp associated with data, the data may be rewritten on the same physical block, a new physical block, the same LBA, a new LBA, and/or combinations thereof. The external host may initiate a procedure for rewriting data based on the analysis of the time stamps (operation 555).

A time stamp may be analyzed to determine if the data associated with the time stamp should be updated and a procedure for rewriting data may be initiated based on the analysis. For example, if a newer version of the data is available, the data may be automatically updated. If the updated data available is older than the time stamp associated with the version of the data on the host, then the updated data may not be transmitted to the host since the updated data may be a newer or the same version as the data residing on the host.

In some implementations, times stamps may be analyzed to determine if a time stamp should be updated (operation 560). For example, when a device is reset, the date and/or the time on a device may be inaccurately modified and/or reset to a default date and/or time. When data is written to the device after it is reset but prior to the data and/or time being updated, it may be associated with an inaccurate time stamp. Correcting time stamps that are inaccurate may prevent data from being rewritten based on an inaccurate time stamp. Correcting time stamps may also facilitate retrieving data, such as when a user searches data on a memory based on time stamps.

An application on the external host may record, on a memory of the external host, time stamps associated with when data was transferred to the host. The time stamp obtained from the host may be compared to the time stamp recorded by the external host. Deviations larger than a specified amount may be corrected. For example, a music management software application may record when songs are downloaded to a music player. If the music player is reset and data is stored after the reset, the music management software application may correct the time stamps associated with data stored after the reset. If the internal clock of the host deviates from an internal clock of the internal clock of the external host, time stamps may also deviate. Thus, time stamps that deviate greater than a specified value may be modified based on time stamps stored in the external host.

In some implementations, a host with an internal clock may store changes in time settings. The changes in time settings may be retrieved by an external host and analyzed. Changes in time settings exceeding a specified amount may indicate inaccuracies in the internal clock of the host and time stamps after the change in time settings may be corrected to account for the inaccuracy in the internal clock. For example, the host may store the change in the time settings on the internal clock periodically such as every hour. If the change in time settings stored exceeds an hour or exceeds an hour plus a tolerated deviation (e.g., 10 minutes), this may indicate that the internal clock is not tracking time accurately and/or that the device has been reset. The time stamps after the unacceptable change in time settings may be modified based on the stored change in the time setting. For example, if after a one hour, internal clock indicates the time setting is 10 years prior to the last clock reading, the time stamps after the last accurate reading may be modified based on the detected change in time setting (e.g., 10 years may be added to each time stamp).

A notice may be presented on the host (e.g., on the presentation interface of the host) based on the analysis (operation 565). The notice may be presented on an external host coupled to the host (e.g., on the presentation interface of the external host). For example, when the number of bad blocks exceeds a specified value and/or an erase count exceeds a specified value, a notice may be presented that the device will fail soon. The notice may be graphic, text, and/or audio signals.

The retrieved metadata may be modified based on the analysis (operation 570). For example, if the bad block listing is modified, the portion of the metadata that includes bad block listings may be modified. Metadata may also be modified when an error correcting code is modified (e.g., made more stringent). Time stamps may also be modified based on the analysis.

The metadata may be transmitted to the host (operation 575). In some implementations, at least the modified portions of the metadata may be transmitted to the host. The external host may transmit a command to the host to modify metadata. The metadata may be stored on a memory of the host (operation 580). The metadata transmitted to the host may replace metadata previously stored on the host and retrieved by the external host.

Although a user has been described as a human, a user may be a person, a group of people, a person or persons interacting with one or more computers, and/or a computer system, as appropriate.

Various implementations of the systems and techniques described here can be realized in digital electronic circuitry, integrated circuitry, specially designed ASICs (application specific integrated circuits), computer hardware, firmware, software, and/or combinations thereof These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer (e.g., host or external host) having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to interact with a user as well. For example, feedback provided to the user by an output device may be any form of sensory feedback (e.g., visual feedback, auditory feedback, and/or tactile feedback) and/or input from the user may be received in any form, including acoustic, speech, or tactile input.

The systems and techniques described here can be implemented in a computing system that includes a back end component (e.g., as a data server), a middleware component (e.g., an application server), a front end component (e.g., a client computer with a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and a server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, a processor of the external host may initiate procedures on the host in response to the analysis. The external host may transmit a command to the processor of the host to change metadata based on the analysis. As another example, the external host may request that procedures be initiated in response to analysis. Among other modifications, the described operations may be performed in a different order than is described and some operations may be added or deleted. For example, erase count and/or time stamps may not be analyzed. Metadata may not be modified based on the analysis. In addition, bad block listings may not be tested. As another example, notices may not be present on the host. Accordingly, other implementations are within the scope of this application.

It is to be understood the implementations are not limited to particular systems or processes described. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a processor" includes a combination of two or more processors and reference to "a memory" includes mixtures of different types of memories.

What is claimed is:

1. A method for managing memory comprising:
receiving, by an external host, metadata for one or more data blocks in a nonvolatile memory of a portable device, the metadata identifying an initial error correction code (ECC) algorithm for each of the data blocks;
determining, by the external host, a bad data block in the nonvolatile memory of the portable device based on the received metadata, wherein the bad data block includes one or more errors, and wherein the bad data block comprises a first bad data block;
modifying the received metadata to identify, for the bad data block, a subsequent ECC algorithm having a strength greater than a strength of the initial ECC algorithm;
transmitting the modified metadata to the portable device, wherein the portable device is configured to, apply execute the subsequent ECC algorithm to correct the one or more errors in the bad data block; and
determining a second bad data block based on an associated time stamp or erase count exceeding a specified threshold, wherein the metadata identifies the associated time stamp or the erase count.

2. The method of claim 1, further comprising:
detecting, by the external host, a temporary connection with the portable device; and
in response to the detecting, transmitting, through the temporary connection, a request for the metadata for the data blocks in the nonvolatile memory of the portable device.

3. The method of claim 2, wherein the temporary connection includes a Universal Serial Bus (USB) connection or a FireWire connection.

4. The method of claim 1, further comprising transmitting at least one of a write command or an erase command to the nonvolatile memory to verify the bad data block.

5. The method of claim 1, further comprising:
transmitting a command signal to rewrite data associated with a time stamp; and
updating the time stamp in the received metadata.

6. The method of claim 1, wherein the nonvolatile memory comprises flash memory.

7. A computer program product encoded on a tangible, non-transitory storage medium, the product comprising computer readable instructions for causing one or more processors to perform operations comprising:
receiving, by an external host, metadata for one or more data blocks in a nonvolatile memory of a portable device, the metadata identifying an initial error correction code (ECC) algorithm for each of the data blocks;
determining, by the external host, a bad data block in the nonvolatile memory of the portable device based on the received metadata, wherein the bad data block includes one or more errors, and wherein the bad data block comprises a first bad data block;

modifying the received metadata to identify, for the bad data block, a subsequent ECC algorithm having a strength greater than a strength of the initial ECC algorithm;

transmitting the modified metadata to the portable device, wherein the portable device is configured to, apply the subsequent ECC algorithm to correct the one or more errors in the bad data block; and determining a second bad data block based on an associated time stamp or erase count exceeding a specified threshold, wherein the metadata identifies the associated time stamp or the erase count.

8. The computer program product of claim 7, the instructions further comprising:

detecting, by the external host, a temporary connection with the portable device; and in response to the detecting, transmitting, through the temporary connection, a request for the metadata for the data blocks in the nonvolatile memory of the portable device.

9. The computer program product of claim 8, wherein the temporary connection includes a Universal Serial Bus (USB) connection or a FireWire connection.

10. The computer program product of claim 7, the instructions further comprising transmitting at least one of a write command or an erase command to the nonvolatile memory to verify the bad data block.

11. The computer program product of claim 7, the instructions further comprising:

transmitting a command signal to rewrite data associated with a time stamp; and updating the time stamp in the received metadata.

12. The computer program product of claim 7, wherein the nonvolatile memory comprises flash memory.

13. A computing device, comprising: one or more processors configured to:

receive metadata for one or more data blocks in a nonvolatile memory of a portable device, the metadata identifying an initial error correction code (ECC) algorithm for each of the data blocks;

determine a bad data block in the nonvolatile memory of the portable device based on the received metadata, wherein the bad data block includes one or more errors, and wherein the bad data block comprises a first bad data block;

modify the received metadata to identify, for the bad data block, a subsequent ECC algorithm having a strength greater than a strength of the initial ECC algorithm;

transmit the modified metadata to the portable device, wherein the portable device is configured to apply the subsequent ECC algorithm to correct the one or more errors in the bad data block; and determine a second bad data block based on an associated time stamp or erase count exceeds a specified threshold, the metadata identifies the associated time stamp or the erase count.

14. The computing device of claim 13, the processors further configured to:

detect a temporary connection with the portable device; and in response to the detecting, transmit, through the temporary connection, a request for the metadata for the data blocks in the nonvolatile memory of the portable device.

15. The computing device of claim 14, wherein the temporary connection includes a Universal Serial Bus (USB) connection or a FireWire connection.

16. The computing device of claim 13, the processors further configured to transmit at least one of a write command or an erase command to the nonvolatile memory to verify the bad data block.

17. The computing device of claim 13, the processors further configured to: transmit a command signal to rewrite data associated with a time stamp; and update the time stamp in the received metadata.

18. The computing device of claim 13, wherein the nonvolatile memory comprises flash memory.

* * * * *